(12) United States Patent
Mattila

(10) Patent No.: US 8,095,685 B2
(45) Date of Patent: Jan. 10, 2012

(54) PROVISION OF A SERVICE TO SEVERAL SEPARATELY MANAGED NETWORKS

(75) Inventor: Panu Mattila, Tampere (FI)

(73) Assignee: TeliaSonera AB, Stockholm (SE)

( * ) Notice: Subject to any disclaimer, the term of this patent is extended or adjusted under 35 U.S.C. 154(b) by 355 days.

(21) Appl. No.: 11/920,901

(22) PCT Filed: May 19, 2006

(86) PCT No.: PCT/FI2006/050201
§ 371 (c)(1),
(2), (4) Date: Nov. 21, 2007

(87) PCT Pub. No.: WO2006/125860
PCT Pub. Date: Nov. 30, 2006

(65) Prior Publication Data
US 2009/0083437 A1    Mar. 26, 2009

(30) Foreign Application Priority Data
May 24, 2005 (FI) .................................. 20055246

(51) Int. Cl.
*G06F 15/16* (2006.01)
*H04W 4/00* (2009.01)
(52) U.S. Cl. ..................... 709/245; 709/249; 455/433
(58) Field of Classification Search .............. 709/245, 709/249; 455/433
See application file for complete search history.

(56) References Cited

U.S. PATENT DOCUMENTS

| | | |
|---|---|---|
| 2002/0101859 A1* | 8/2002 | Maclean .................. 370/352 |
| 2003/0081607 A1* | 5/2003 | Kavanagh ................ 370/392 |
| 2003/0176188 A1* | 9/2003 | O'Neill .................... 455/433 |
| 2004/0008650 A1* | 1/2004 | Le et al. .................. 370/338 |
| 2004/0054794 A1* | 3/2004 | Lantto et al. ............ 709/229 |
| 2004/0066769 A1* | 4/2004 | Ahmavaara et al. .... 370/338 |

FOREIGN PATENT DOCUMENTS

| | | |
|---|---|---|
| GB | 2 401 283 A | 11/2004 |
| WO | WO 02/47415 A1 | 6/2002 |
| WO | WO 02/085051 A1 | 10/2002 |

* cited by examiner

*Primary Examiner* — Ranodhi Serrao
(74) *Attorney, Agent, or Firm* — Cozen O'Connor

(57) ABSTRACT

A domain name server to be connected to a telecommunication network, the server comprising a memory for storing the names of network elements constituting the management domain of the domain name server and the IP addresses corresponding to the names, and a processor for mapping the received access point name to the stored network element IP address. The domain name server is arranged to identify a name included in a session request as an Internet address related to a certain service and map the network element name to a certain IP address of the management domain of another network, the IP address corresponding to the access point of the server. The invention enables provision of service to several separately managed networks by one service sub-system, which minimizes the amount of work required to establish and manage the hardware needed to provide service.

8 Claims, 3 Drawing Sheets

PROVISION OF A SERVICE TO SEVERAL SEPARATELY MANAGED NETWORKS

PRIORITY CLAIM

This is the U.S. national stage of application No. PCT/FI2006/050201, filed on 19 May 2006. Priority is claimed on the following application: Finland, Application No.: 20055246, Filed 24 May 2005, the content of which is incorporated herein by reference.

BACKGROUND OF THE INVENTION

The invention relates to telecommunication systems and in particular to a domain name server, a telecommunications network, a method and a computer program product in accordance with the characterizing parts of the independent claims.

BRIEF DESCRIPTION OF THE INVENTION

Telecommunication network services are generally provided from a server sub-system used via an access point (AP) of the subscribers home network. For example, in the case of a mobile subscriber, a PDP context (Packet Data Protocol, PDP) is activated for the subscribers mobile station upon registration and a connection is established between the mobile station and a serving GPRS support node (SGSN). After this, a registered subscriber may, at any time he wishes, activate a session by sending a session request to the network.

To activate a session related to a certain service, the subscriber gives a service identifier to the mobile station. This may be performed, for example, by keying in the service identifier or by selecting the service from a menu displayed to the subscriber. When the serving GPRS support node (SGSN) receives a session request from the mobile station, it supplements the service identifier with a home network identifier. These form an access point name (APN). The serving GPRS support node transmits the request to a domain name server (DNS) to find out an IP address (Internet Protocol, IP) or addresses corresponding to the access point name. When the user is in the home network, the server typically returns the IP address of the home network gateway GPRS support node to the operation service. The operation service transmits the request to this gateway GPRS support node (GGSN), which transmits the request to the sub-system identified on the basis of the access point name.

In the case of mobile subscribers, traffic is tunnelled during roaming from the visited network to the gateway GPRS support node of the home network. When a visiting subscriber requests a session, the domain name server of the visited network notes that it does not recognize the access point name indicated in the request and transmits the request to a higher-level domain name server through an inter-operator gateway network. Using the higher-level domain name server, the domain name server of the visited network finds out the address of the home network's domain name server and transmits the request to it. The home network's domain name server returns the gateway GPRS support node of the home network related to the access point name to the visited network's domain name server, which forwards the address to the visited network's serving GPRS support node. After this, a tunnelled connection can be established with the home network's gateway GPRS support node.

As the use of different media types becomes more common, it is obvious that available services increase in number and variety. Here the term "operator" refers to an entity managing one or more networks, i.e. it may be, for example, a private operator company, an operator group or an operator alliance. Nowadays operators offer more and more services or service packets of their own which are distributed in a similar format over the domains of several networks. Correspondingly, companies have tailored services that are used in parallel in several offices. Neither do private service providers use only one network, but several games, for example, are played simultaneously all over the world. Each network managed separately always requires a server of its own.

On the other hand, it is clear that the operational environment of users is globalising. Operators manage more and more separate networks and strive to extend their operations over the area of several countries. The employees of a company move in the domains of different networks, for example from one country to another. Users typically wish that at least certain services be available in a similar format in the networks of their own operator regardless of their current location. To achieve this, the home network of each user has to be provided with hardware for each service to be provided.

The above-mentioned issues increase the number of sub-systems and hardware entities needed to offer a single service. In particular, if users are scattered to a plurality of networks, the number of users per one hardware entity may be very small. Furthermore, if a certain service is to be available in a similar format for employees working at different offices, all hardware entities must be managed collectively one way or the other. This increases the amount of administrative work considerably and subjects the user to inconvenient error situations.

An object of the invention is to provide a method and an apparatus implementing the method for providing services in the domains of different networks using a smaller number of devices, which decreases the amount of work required to configure and maintain the devices.

The object of the invention is achieved by a method and a system which are characterized by what is stated in the independent claims. The preferred embodiments of the invention are disclosed in the dependent claims.

The invention is based on forming a virtual entity of networks that are to be managed collectively from the service point of view (operator networks, networks at the offices of a company, etc.). In this entity, service is offered from a common sub-system accessed through one gateway GPRS support node. The domain server of each network to be included in this entity is arranged to identify the identifier of the service indicated in a session request and enable routing of requests including this identifier to the above-mentioned gateway GPRS support node regardless of whether the gateway GPRS support node belongs to its management domain or not.

An advantage of the method and system according to the invention is that service may be provided even from only one server to several networks managed separately, and thus the work and costs needed to establish and manage the hardware required to provide service can be minimized. This enables implementation of more specialized services since a single service may be used by users of several different networks. Furthermore, the solution can be implemented as an additional function supplementing the normal function of network elements. Thus, the advantages are achieved without significant changes to the existing devices, and introduction of the inventive solution causes no changes to the devices where the invention is not utilized.

BRIEF DESCRIPTION OF THE FIGURES

The invention will now be described in greater detail by means of preferred embodiments with reference to the accompanying drawings, in which.

DETAILED DESCRIPTION OF THE INVENTION

Figure 1:
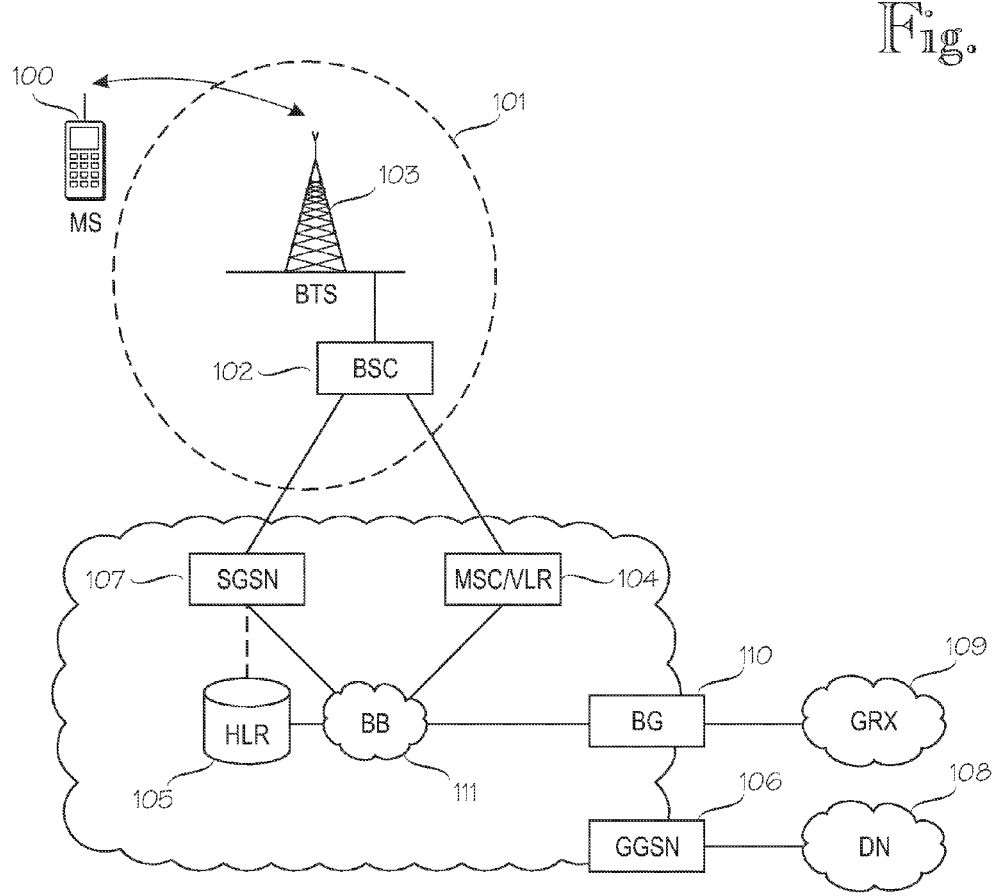
FIG. 1 illustrates a block diagram of a telecommunications system.

FIG. 1 is a block diagram of a telecommunications system illustrating parts essential for understanding the invention. The invention will be described here by using the terms and elements of a GPRS packet radio system (General Packet Radio Service, GPRS) as an example, but the invention is also applicable to any fixed or wireless packet-switched telecommunications system where service is offered from at least one sub-system arranged in a client network of the telecommunications network.

The telecommunications system according to FIG. 1 includes a mobile station 100 substantially consisting of a terminal and a subscriber identification unit. There is a radio interface between the mobile station 100 and a base station system (BSS) 101 of a GSM network (Global System for Mobile Communications) functioning as the radio access network. In the base station system, each cell is served by a base station BS 103 under a base station controller 102. The base station controller BSC 102 is connected to a mobile services switching centre 104 for circuit-switched services and to a serving GPRS support node SGSN (GPRS =General Packet Radio Service) for packet-switched services.

Subscriber data related to the mobile station are stored permanently in a home location register (HLR) 105. For circuit-switched services, subscriber data are transferred to the visitor location register (VLR) of the mobile services switching centre serving the mobile station at a given time.

The GPRS infrastructure comprises support nodes, such as a gateway GPRS support node (GGSN) 106 and a serving GPRS support node (SGSN) 107 connected through the operator's backbone (BB) network 111. The main functionality of the gateway GPRS support node GGSN 106 is interaction with external data networks. The gateway GPRS support node GGSN 106 maintains the mobile stabon's MS 100 location data using the routing information produced by serving GPRS support nodes on the mobile station's route and routes received protocol packets in encapsulated format to the serving GPRS support node SGSN 107 serving the mobile station MS 100 at a given time. The gateway GPRS support node GGSN 107 also processes billing of data traffic.

The main functions of the serving GPRS support node SGSN 107 are detecting new mobile stations in its service domain, participating in their registration processes, maintaining data on the location of the mobile stations and transmitting data packets to the mobile station MS 100 and from the mobile station MS 100. Information about mapping between the identity and the PDP address of the mobile stations is stored in the home location register 105, from which SGSN 107 enquires it, if necessary.

For implementation of roaming between different GPRS networks, there are GPX (GPRS Roaming Exchange) operators on the market whose GPRS networks form a GRX gateway network 109. The client GPRS network of each GRX network includes a border gateway (BG) 110 through which the client network connects to the gateway network.

Figure 2:
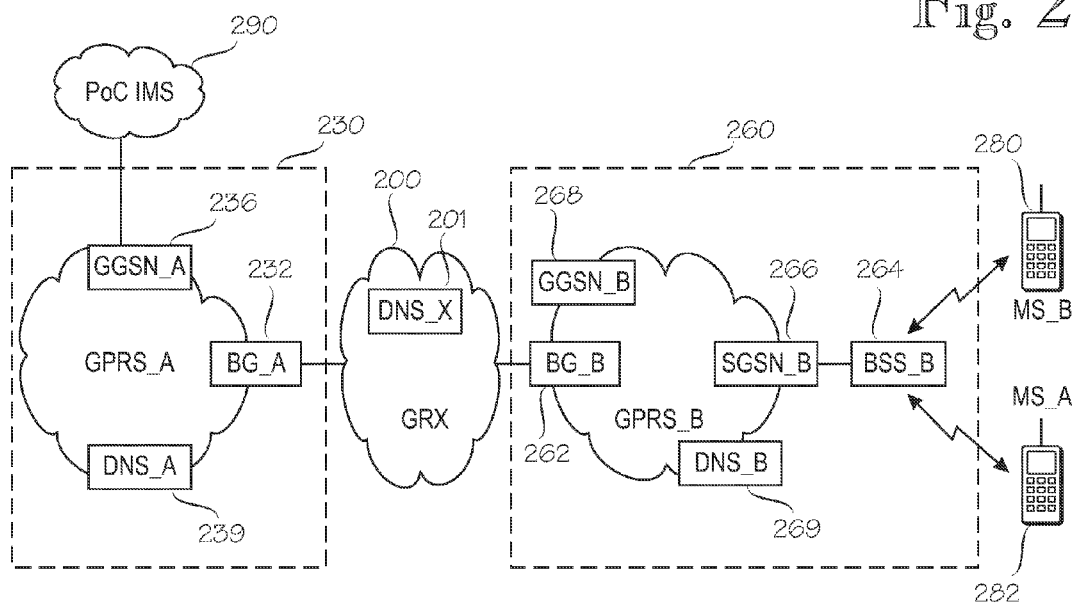
FIG. 2 illustrates a GRX gateway network formed by two GPRS client networks.

FIG. 2 illustrates a GRX network 200 with two client networks GPRS_A 230 and GPRS_B 260 connected thereto. In prior art solutions, in accordance with the standard roaming principle, a subscriber MS_A 282 of the client network GPRS_A 230, who is in the domain of the client network GPRS_B 260 connected to the same gateway network GRX 200, may use the services offered by his home network GPRS_A 230 via the client network. In connection with registration, a PDP context (Packet Data Protocol PDP) is activated for the mobile station of the client network GPRS_A 230 subscriber 282, and a tunnelled connection is formed between the gateway GPRS support node 236 of the mobile station's own client network GPRS_230 and the serving GPRS support node 266 of the visited network.

In the present embodiment, a service sub-system 290 is connected to the client network GPRS_A 230 to provide the subscriber with the opportunity of using a PoC service (Push-to-Talk over Cellular) and thus accessing real-time private and group call services through the mobile communication network. It will be obvious to a person skilled in the art that here the PoC service only relates to the description of a single embodiment and the invention is not limited to this particular service.

To implement routing for roaming, each client network typically requires a domain name server. At the conceptual level, the name service consists of one decentralized and verified tree-like database where each domain corresponds to a tree in the hierarchy. The main function of the name service is to convert the domain names of its management domain into IP addresses and vice versa. The domain name servers in client networks are typically resolving domain name servers to which the devices of the network in question address their questions related to the domain name service. A server with different kind of functionality is represented by an autorative domain name server of the GRX network, which maintains data on the domain name servers of the GRX network. Resolving servers may enquire domain name data from the autorative domain name server when, for example, it cannot perform routing using its own data.

In FIG. 2, the client network GPRS_B 260 comprises a domain name server DNS_B 269, which is typically a resolving domain name server. It should be noted, however, that autorative and resolving functionalities may, in some embodiments, be combined physically or logically into the same unit, and thus the type of the domain name server has no substantial influence on the interpretation of the scope of protection.

Figure 3:
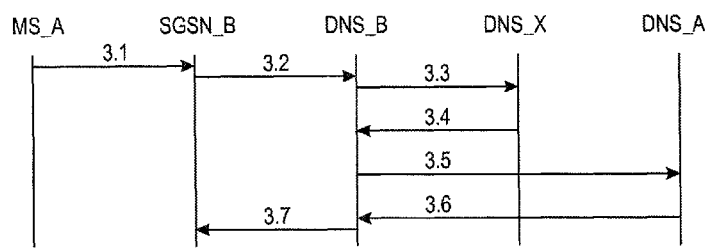
FIG. 3 illustrates communication between the elements of FIG. 2 in connection with a usual roaming situation.

FIG. 3 illustrates prior art communication between the elements of FIG. 2 when the client network GPRS_A 230 subscriber MS_A 282 wishes to make a PoC call when visiting the client network GPRS_B 260. In step 3.1, the subscriber gives a session request identifying the PoC service. Typically, this is performed by the subscriber keying the service identifier into the mobile station. The request is transmitted via the client network GPRS_B 260 base station system BSS_B 264 to the serving GPRS support node SGSN_B 266, which supplements the identifier with the identifiers identifying the subscriber's home network. In that case, the session request includes the access point name, for example poc.mncaaa.mccAAA.gprs, where mnc refers to the mobile network code and mcc to the mobile country code. The serving GPRS support node SGSN_B 266 transmits (step 3.2) the request to the domain name server DNS_B 269 to find out the IP address or addresses (Internet Protocol, IP) corresponding to the access point name.

If the subscriber in question were a subscriber of the client network GPRS_B 260, the name of the gateway GPRS support node GGSN_B 268 would be found in the database of the domain name server DNS_B 269, and the domain name server DNS_B 269 would return the IP address of the gateway GPRS support node GGSN_B 268 to the serving GPRS support node SGSN_B 266 in the client network GPRS_B 260. As the subscriber in question is a subscriber of the client network GPRS_A 230, the domain name server DNS_B 269 does not know the IP address of the gateway GPRS support node, but transmits the request via the border gateway BG_B 262 to an autorative domain name server DNS_X 201 of the GRX network (step 3.3). The autorative domain name server DNS_X 201 returns (step 3.4) a list of domain name servers of the client network GPRS_A 230 to the resolving domain name server DNS_B 269. The resolving domain name server DNS_B 269 selects one DNS_A 239 from among them and transmits (step 3.5) an enquiry to it via the gateway network GRX 200. The client network GPRS_A 230 domain name server DNS_A 239 responds by sending (step 3.6) the IP address of the gateway GPRS support node GGSN_A 236 transmitting the PoC service, and the domain name server DNS_B 269 returns (step 3.7) this address to the serving GPRS support node SGSN_B 266 of the client network GPRS_B 260. After this, the serving GPRS support node SGSN_B 266 can establish a connection to the gateway GPRS support node GGSN_A 236 via the gateway network GRX 200, and traffic can be tunnelled in the manner described above between the serving GPRS support node SGSN_B 266 of the visited network and the gateway GPRS support node GGSN_A 236 of the home network.

It should be noted that the figure includes only the elements essential for understanding the invention. It will be obvious to a person skilled in the art that, for example, in practice there may be several GRX networks connected to one another and several GPRS networks connected thereto. It is also clear that the gateway GPRS support node GGSN related to the service may be connected to any client network GPRS_A, GPRS_B or directly to the gateway network GRX.

According to the invention, in the embodiment of FIG. 2, the PoC service is not offered only from the home network to home network subscribers but the gateway GPRS support node GGSN_A 236 of the client network GPRS_A 230 is arranged to function as the gateway GPRS support node to the sub-system 290 of the PoC service both for the subscribers of both the client network GPRS_A 230 and the client network GPRS_B 260. In that case, the client network GPRS_B 260 subscriber MS_B 280 has the opportunity of using the PoC service even though the subscriber's home network GPRS_B 260 does not provide this kind of sub-system. It is naturally clear that the invention is not limited only to the PoC service but is applicable to any packet-switched service implemented through a telecommunications network.

Figure 4:
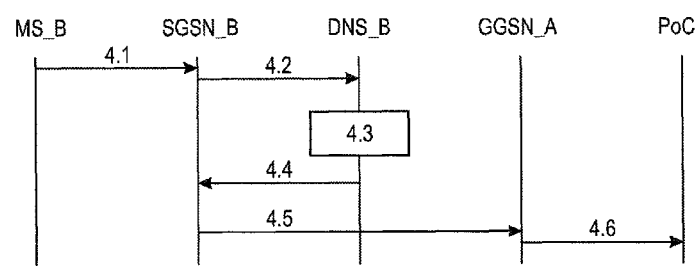
FIG. 4 illustrates communication between the elements of FIG. 2 in an embodiment of the invention.

FIG. 4 illustrates communication according to the invention between the elements of FIG. 2 when the client network GPRS_B 260 subscriber MS_B 280 wishes to send a PoC message. In step 4.1, the subscriber MS_B 280 gives a session request which identifies the PoC access point. The request is transmitted in a standard manner through the radio network to the serving GPRS support node SGSN_B 266, which supplements the identifier with the identifiers identifying the subscriber's home network. In that case, the session request includes the access point name, for example poc.mncbbb.mccBBB.gprs. The serving GPRS support node SGSN_B 266 transmits (step 4.2) the request to the domain name server DNS_B 269 to find out the IP address or addresses (Internet Protocol, IP) corresponding to the gateway GPRS support node name.

Usually, the name of the gateway GPRS support node GGSN_B 268 would be found in the database of the domain name server DNS_B 269, and the domain name server DNS_B 269 would return the IP address of the gateway GPRS support node GGSN_B 268 to the serving GPRS support node SGSN_B 266 in the client network GPRS_B 260. However, since the client network GPRS_B 260 has no PoC server, connection establishment would result in an error situation.

According to the invention, the domain name server DNS_B 269 is, however, arranged to identify a request as being related to a certain service and map the access point name included in the session request to the IP address of the management domain of another telecommunications network. In the present example, the DNS_B 269 identifies (step 4.3) the session request poc.mncbbb.mccBBB.gprs as referring to the PoC service and returns (step 4.4) the IP address of the client network GPRS_A gateway GPRS support node GGSN_A 236 to the serving GPRS support node SGSN_B 266. The mapping of a name to an IP address related to the service included in step 4.3 can be carried out in several alternative ways. For example, the IP address may be directly stored in the domain name server DNS_B, in which case signalling is performed in accordance with FIG. 4. Alternatively, the domain name server DNS_B 269 may be arranged to change the enquiry so that the access point name refers to the client network GPRS_A 230 including the PoC sub-system (poc.mncbbb.mccBBB.gprs ->poc.mncaaa.mccAM.gprs). In that case, the signalling further includes the enquiries shown in steps 3.3 to 3.6 of FIG. 3 that are made to the autorative domain name server and to the do main name server of the client network including the service sub-system.

The serving GPRS support node SGSN_B 266 receives the IP address of the client network GPRS_A 230 gateway GPRS support node GGSN_A 236 and transmits (step 4.5), on the basis of the address, a session request to the client network gateway GPRS support node GGSN_A 236. The gateway GPRS support node forwards (step 4.6) the request to the PoC sub system 290, where the processing of the PoC session request continues in a manner known to a person skilled in the art.

The above enables offering the service both to the subscribers of the client network GPRS_A 230 and to the subscribers of the client network GPRS_B 260 by means of only one PoC sub-system 290. The functionality according to the invention can be added as a supplementary feature to a standard domain name server, in which case the other elements of the telecommunications system may function normally. Neither need the other existing functionalities of the domain name server be changed. This provides the advantage that the implementation of the functionality only in some client networks requires no changes to the function of the GRX network or the other client networks and/or client network domain name servers but entities significant to the service can be established freely according to the need. It should be noted that there may naturally be one or more service sub-systems that can be utilized through the GRX network, the number of sub-systems being at least one. However, it is essential that the solution according to the invention does not require a separate server for each network having subscribers using the service.

Figure 5:
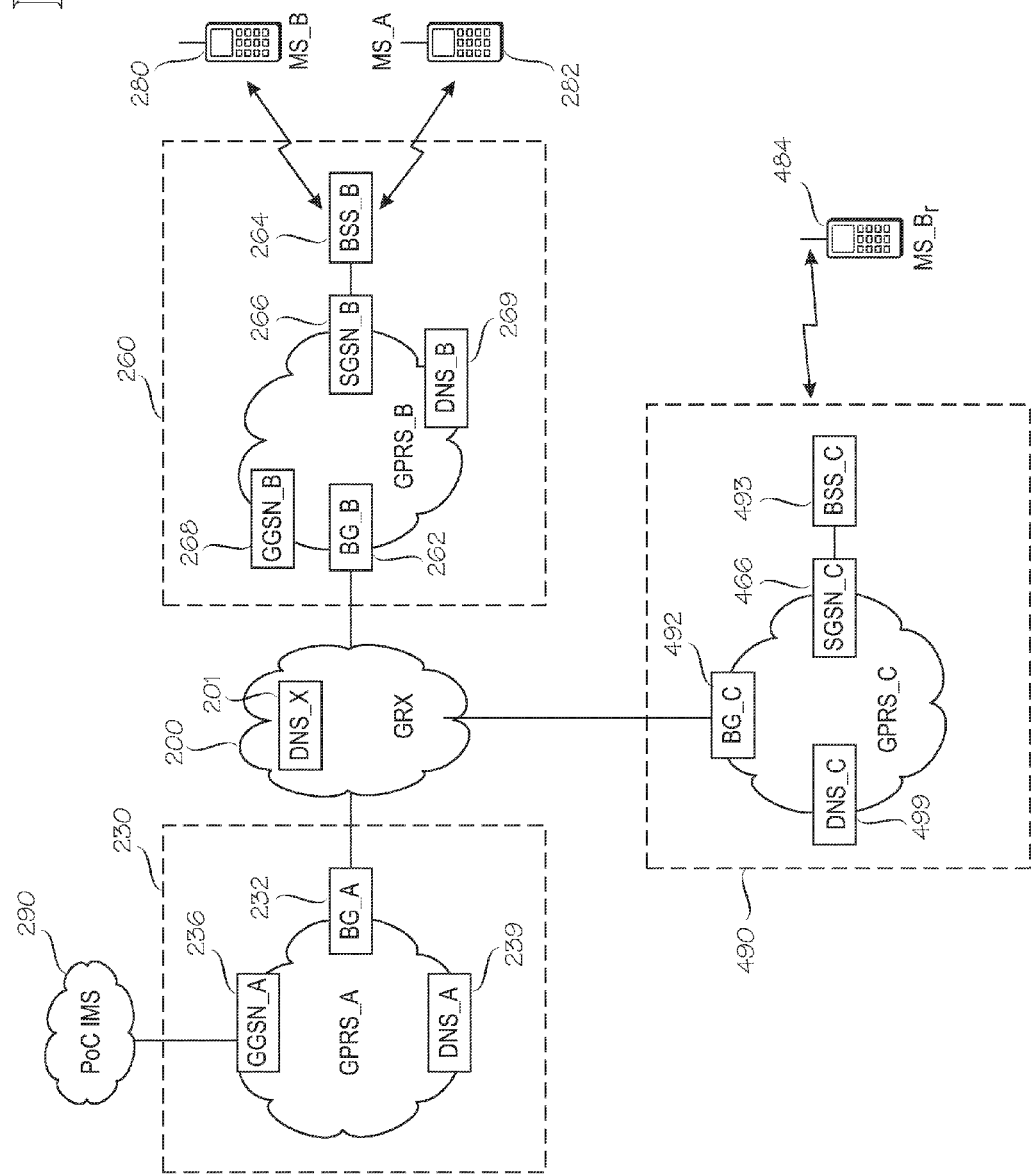
FIG. 5 illustrates a GRX gateway network formed by three GPRS client networks.

FIG. 5 illustrates a gateway network GRX 200 formed by three client networks GPRS_A 230, GPRS_B 260 and GPRS_C 490. According to the standard roaming principle, a subscriber MS_Br 484 of the client network GPRS_B 260, who is in the domain of the client network GPRS_C 490 connected to the same gateway network GRX 200, may use the services offered by his home network GPRS_B 260 via the client network in the manner described above. In addition, the solution according to the invention enables the client network GPRS_B 260 subscriber MS_Br 484, who is in the domain of the client network GPRS_C 490 connected to the same gateway network GRX 200, to also use the services of the sub-system 290 arranged in the client network GPRS_A 230. FIG. 5 shows the following client network elements GPRS_C 490 that correspond to the elements described functionally in connection with FIG. 2: border gateway BG_C 492, domain name server DNS_C 499, serving GPRS support node SGSN_C 466, and base station system BSS_C 493.

Figure 6:
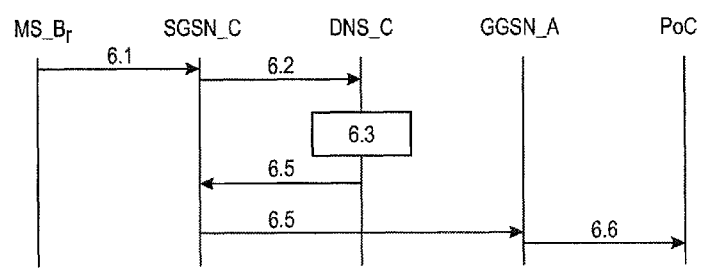
FIG. 6 illustrates communication between the elements of FIG. 5 in another embodiment of the invention.

FIG. 6 correspondingly illustrates communication between the elements of FIG. 5 in accordance with the invention when the client net work GPRS_B 260 subscriber MS_Br 484 wishes to make a PoC call when roaming in the domain of the client network GPRS_C 490. In step 6.1, the subscriber MS_Br 484 gives a session request identifying the PoC access point. The request is transmitted in a normal manner through the radio network to the serving GPRS support node SGSN_C 466 of the client network GPRS_C 490, which supplements the identifier with the identifiers identifying the subscriber's home network. In that case, the session request includes the access point name, for example poc.mncbbb.mccBBB.gprs. The serving GPRS support node SGSN_C 466 transmits (step 6.2) the request to the domain name server DNS_C 499 to find out the IP address or addresses (Internet Protocol, IP) corresponding to the gateway GPRS support node name.

According to the invention, the domain name server DNS_C 499 is arranged to identify the request as being related to a certain service and map the access point name included in the session request to the IP address of the management domain of another telecommunications network. In the present example, the DNS_C 499 identifies (step 6.3) the session request poc.mncbbb.mccBBB.gprs as referring to the PoC service and finds out and returns (step 6.4) the IP address of the client network GPRS_A gateway GPRS support node GGSN_A 236 to the local serving GPRS support node SGSN_C 466. The mapping of a name to an IP address related to the service can be carried out in several alternative ways within the scope of protection. For ex ample, the IP address may be directly stored in the home network domain name server DNS_B 269, or the home network domain name server DNS_B 269 may be arranged to change the name enquiry so that the access point name refers to the client network GPRS_A 230 including the PoC sub-system (poc.mncbbb.mccBBB.gprs ->poc.mncaaa.mccAAA.gprs).

The serving GPRS support node SGSN_C 466 receives the IP address of the client network GPRS_A 230 gateway GPRS support node GGSN_A 236 and transmits (step 6.5), on the basis of the address, a session request to the client network gateway GPRS support node GGSN_A 236. The gateway GPRS support node forwards (step 6.6) the request to the PoC sub-system 290, where the processing of the PoC session request continues in a manner known to a person skilled in the art.

Figure 7:
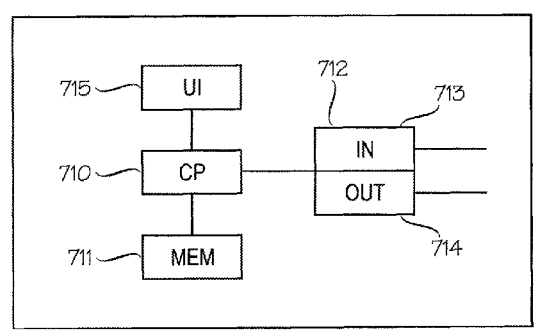
FIG. 7 is a structural chart illustrating the logical structure of a domain name server.

FIG. 7 is a structural diagram illustrating the logical structure of a domain name server. The server comprises a processor or processing means 710, i.e. an element including an arithmetic logic unit, a number of special registers and control circuits. The processing means include a memory unit or memory means 711, i.e. a data storage arrangement where data, programs or user data readable by a computer can be stored. The memory means typically include memory units allowing both reading and writing functions (Read-and-Write Memory, RAM) as well as memory units allowing only reading (Read-only Memory, ROM). The memory means 711 of the domain name server substantially comprise a database where the mapping between the names of the network elements in the domain name server management domain and the network address related to the names may be stored. The server further comprises an interface element 712 including an input or input means 713 for receiving data from a telecommunications network and for transferring data to processing in server-internal processes, and an output or output means 714 for outputting data from server-internal processes to a telecommunications network. Such data include name enquiries, and establishment or maintenance data relating to mapping data to be stored in the database of the memory means. The server may alternatively also comprise a user interface 715, which includes elements for receiving data from a server user, such as a keyboard, touch screen, microphone, etc., and elements for outputting data to a subscriber through a display, touch screen, loudspeaker, etc. The processing means 710, memory means 711, interface element 712 and user interface 715 are electrically connected to one another for systematic processing of received and/or stored data according to pre-determined, substantially programmed procedures. Such procedures include the functions according to the inventive solution that were described in connection with the above embodiment. In particular, the processing means 710 and the memory means 711 form mapping means for mapping the access point name related to a certain service to the IP address of the management domain of another telecommunications network. Implementation of the logic units of the server described above is known per se to a person skilled in the art.

When service is provided through at least one client network, the function of the network elements that perform checks related to subscriber rights has to be arranged to correspond to the service entity established. For example, when the serving GPRS support node receives a session request from a mobile station, the serving GPRS support node checks the subscriber profile loaded from the home network to find out whether the subscriber is entitled to use the requested service. In the embodiment shown in FIG. 2, the subscriber profile of the subscriber MS_B 280 thus has to include a permission to use the PoC service. Correspondingly, in some cases, the gateway GPRS support node transmitting the service may check whether the subscriber is en titled to the connection. In the example concerned this means that the rights to use the sub-system are confirmed in respect of the subscribers of both the client network GPRS_A 230 and the client network GPRS_B 260 in the case of FIG. 2 and in respect of the subscribers of the client networks GPRS_A 230, GPRS_B 260 and GPRS_C 490 in the case of FIG. 4.

It will be obvious to a person skilled in the art that as technology advances, the basic idea of the invention may be implemented in various ways. The invention and its embodiments are thus not limited to the above examples but they may be modified within the scope of the claims.

The invention claimed is:

1. A domain name server for connection to a mobile telecommunications network for operating as a domain name server of a home network of a subscriber of the mobile telecommunications network in a management domain, the domain name server comprising:
storage means for storing, in the domain name server, names of network elements constituting the management domain of the domain name server and IP addresses corresponding to the names;

reception means for receiving a request including an access point name in the management domain of the domain name server;

mapping means for mapping the received access point name to a stored IP address of the network element;

the domain name server of the home network further comprising identification means for identifying a received request to include the access point name that belongs to its own management domain and to be related to a defined service; and the mapping means of the domain name server of the home network being arranged to use the storage means to map, in response to identification by the identification means, the access point name to an IP address of a management domain of another domain name server that comprises an access point to a sub-system of the defined service;

wherein the IP address is the IP address of a gateway General Packet Radio Service (GPRS) support node of a network related to the another management domain.

2. A domain name server according to claim 1, wherein the received request is a session request of the defined service or a domain name enquiry.

3. A domain name server according to claim 1, wherein the mapping means are arranged to map the access point name by changing the received access point name to an access point name associated with another management domain.

4. A domain name server according to claim 1, wherein the service is a Push-to-Talk over Cellular (PoC) service.

5. A method of providing domain name service of a home network of a subscriber of a mobile telecommunications network using a domain name server, the method comprising:

storing, in the domain name server, names of network elements constituting the management domain of the domain name server and IP addresses corresponding to the names;

receiving a request including an access point name in the management domain of the domain name server;

mapping the received access point name to a stored IP address of the network element;

identifying a received request to include the access point name that belongs to its own management domain and to be related to a defined service; and using the names of the network elements stored in the domain name server to map, in response to the identified received request, the access point name to an IP address of a management domain of another domain name server that comprises an access point to a sub-system of the defined service;

wherein the IP address is the IP address of a gateway General Packet Radio Service (GPRS) support node of a network related to the another management domain.

6. A method according to claim 5, wherein received request being a session request of the defined service or a domain name enquiry.

7. A method according to claim 5, wherein the step of mapping comprises mapping the access point name to an access point name associated with another management domain.

8. A method according claim 5, wherein the service is a Push-to-Talk over Cellular (PoC) service.

\* \* \* \* \*